(12) United States Patent
Demarne et al.

(10) Patent No.: US 11,537,378 B2
(45) Date of Patent: Dec. 27, 2022

(54) SELECTING A SAMPLE SET OF CLOUD COMPUTING RESOURCES FOR A/B TESTING OF A SOFTWARE DEPLOYMENT

(71) Applicant: Microsoft Technology Licensing, LLC, Redmond, WA (US)

(72) Inventors: Mathieu Baptiste Demarne, Seattle, WA (US); Miso Cilimdzic, Laguna Niguel, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 28 days.

(21) Appl. No.: 17/193,399

(22) Filed: Mar. 5, 2021

(65) Prior Publication Data
US 2022/0283793 A1    Sep. 8, 2022

(51) Int. Cl.
*G06F 8/60* (2018.01)
*G06F 9/50* (2006.01)
*G06F 8/65* (2018.01)

(52) U.S. Cl.
CPC .............. *G06F 8/60* (2013.01); *G06F 9/5027* (2013.01); *G06F 8/65* (2013.01)

(58) Field of Classification Search
None
See application file for complete search history.

(56) References Cited

U.S. PATENT DOCUMENTS

| 9,886,261 B1* | 2/2018 | Hotchkies | H04L 67/34 |
| 2015/0143345 A1* | 5/2015 | Patton | G06F 11/34 |
| | | | 717/131 |

OTHER PUBLICATIONS

"Azure Data Explorer", Mar. 8, 2021, 18 Pages.
"Azure Functions", Mar. 8, 2021, 21 Pages.
"Azure Monitor", Mar. 8, 2021, 19 Pages.
"Azure Storage", Mar. 8, 2021, 13 Pages.
"Azure Synapse Analytics", Mar. 8, 2021, 21 Pages.
"Microsoft Power BI", Mar. 8, 2021, 11 Pages.
Antonopoulos, et al., "Constant Time Recovery in Azure SQL Database", In Proceedings of the VLDB Endowment, vol. 12, Issue 12, Aug. 2019, pp. 2143-2154.

(Continued)

*Primary Examiner* — Duy Khuong T Nguyen
*Assistant Examiner* — Mark A Gooray
(74) *Attorney, Agent, or Firm* — Fiala & Weaver P.L.L.C.

(57) ABSTRACT

A sample set of cloud computing resources is dynamically selected for testing a software deployment. Telemetry data associated with the resources and customer support data associated with customers that utilize the resources are obtained. A subset of the customers is selected based on the customer support data, and a candidate subset of the resources is selected based on the selected subset of customers and the telemetry data. Criteria for the selection is based on usage patterns and is configurable. Resources of customers with special support agreements, and customers previously selected, may be excluded from the candidate subset. The sample set of cloud computing resources may be randomly selected from the candidate subset. Software is deployed to the sample set as a B resource group and tested for issues with an A resource group to determine whether to proceed to full deployment, roll back the deployment, and/or retest the software.

20 Claims, 9 Drawing Sheets

(56) References Cited

OTHER PUBLICATIONS

Campise, et al., "Use maintenance schedules to manage service updates and maintenance", Feb. 2, 2019, 8 Pages.
Demarne, et al., "Reliability Analytics for Cloud Based Distributed Databases", In Proceedings of the ACM SIGMOD International Conference on Management of Data, Jun. 14, 2020, pp. 1479-1492.
Gemert, Anthony Van, "Azure SQL Data Warehouse now supports maintenance scheduling", Sep. 25, 2018, 04 Pages.
Guha, et al., "Robust Random Cut Forest Based Anomaly Detection on Streams", In Proceedings of The 33rd International Conference on Machine Learning, Jun. 11, 2016, 10 Pages.
Kumar, Rohan, "Azure SQL Data Warehouse previews 3x compute scale with unlimited columnar storage", Jul. 10, 2017, 04 Pages.
Lee, et al., "Data Warehouse Units (DWUs) for dedicated SQL pool (formerly SQL DW) in Azure Synapse Analytics", Nov. 22, 2019, 08 Pages.
Shankar, et al., "Query Optimization in Microsoft SQL Server PDW", In Proceedings of the ACM SIGMOD International Conference on Management of Data, May 20, 2012, pp. 767-775.
Talius, Tomas, "Adaptative Caching powers Azure SQL Data Warehouse performance gains", Apr. 30, 2018, 05 Pages.
Talius, Tomas, "Lightning fast query performance with Azure SQL Data Warehouse", Jul. 12, 2018, 05 Pages.
Wang, et al., "GRANO: Interactive Graph-based Root Cause Analysis for Cloud-Native Distributed Data Platform", In Proceedings of the VLDB Endowment, vol. 12, Issue 12, Aug. 2019, pp. 1942-1945.

\* cited by examiner

1100

Identify at least one of the following based on the telemetry data and the customer support data associated with the A resource group and the B resource group: resource process crash signatures of the B resource group, an increase in system error codes returned to one or more customers associated with the B resource group, new system error codes returned to one or more customers associated with the B resource group, a negative change in resource usage in the B resource group, performance-related issues in the B resource group, systematic feature failures in the B resource group, or customer-reported problems associated with the B resource group — 1102

Perform at least one of the following based on the telemetry data and the customer support data associated with the A resource group and the B resource group: cause another sample set of cloud computing resources to be selected for retesting the software deployment, deploy the software to additional resources of the plurality of cloud computing resources, or roll back the deployment of the software from the sample — 1202

FIG. 12

SELECTING A SAMPLE SET OF CLOUD COMPUTING RESOURCES FOR A/B TESTING OF A SOFTWARE DEPLOYMENT

BACKGROUND

Traditional deployments of newly released cloud service software, such as for databases, streaming engines, data lakes, and the like, usually progress in a predictable manner across the cloud. For example, a first sub-region may be upgraded, and after a baking period, the upgrade may continue to subsequent locations unless a health problem is reported. This method of deployment can lead to a large impact blast when a new release reaches production and issues or regressions went undetected during early validation (e.g., in a testing or staging environment). Moreover, most traditional watchdogs measure application health and availability without drilling down into a product's metrics, which allows for only a top-level understanding of a release's stability during the first stage of a production rollout. To palliate such issues, some services put into place, an insider, or early, validation program where a subset of interested customers receive a new version of an online service in a secondary environment for testing purposes. This approach is usually reserved for top customers or it may come at a premium due the overhead of putting such a validation program in place.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method, system, and computer readable medium that stores code for performing the method are described herein. In one aspect, a method is disclosed for dynamically selecting, from among a plurality of cloud computing resources, a sample set of cloud computing resources for testing a software deployment. The plurality of cloud computing resources is deployed on behalf of a plurality of customers of a cloud computing provider to support a corresponding plurality of cloud computing services. The method comprises obtaining telemetry data associated with the plurality of cloud computing resources and obtaining customer support data associated with each of the plurality of customers. A subset of the plurality of customers of the cloud computing provider is selected based at least on the customer support data, and a candidate subset of the plurality of cloud computing resources is selected based at least on the selected subset of the plurality of customers and the telemetry data. The sample set of cloud computing resources for testing the software deployment is selected from among the candidate subset.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 11 is a flowchart of a method for conducting A/B testing of a software deployment to a sample set of cloud computing resources, based on telemetry data and customer support data, according to an example embodiment.

FIG. 12 is a flowchart of a method for responding to the results of A/B testing of a sample set of cloud computing resources, according to an example embodiment.

Figure 1:
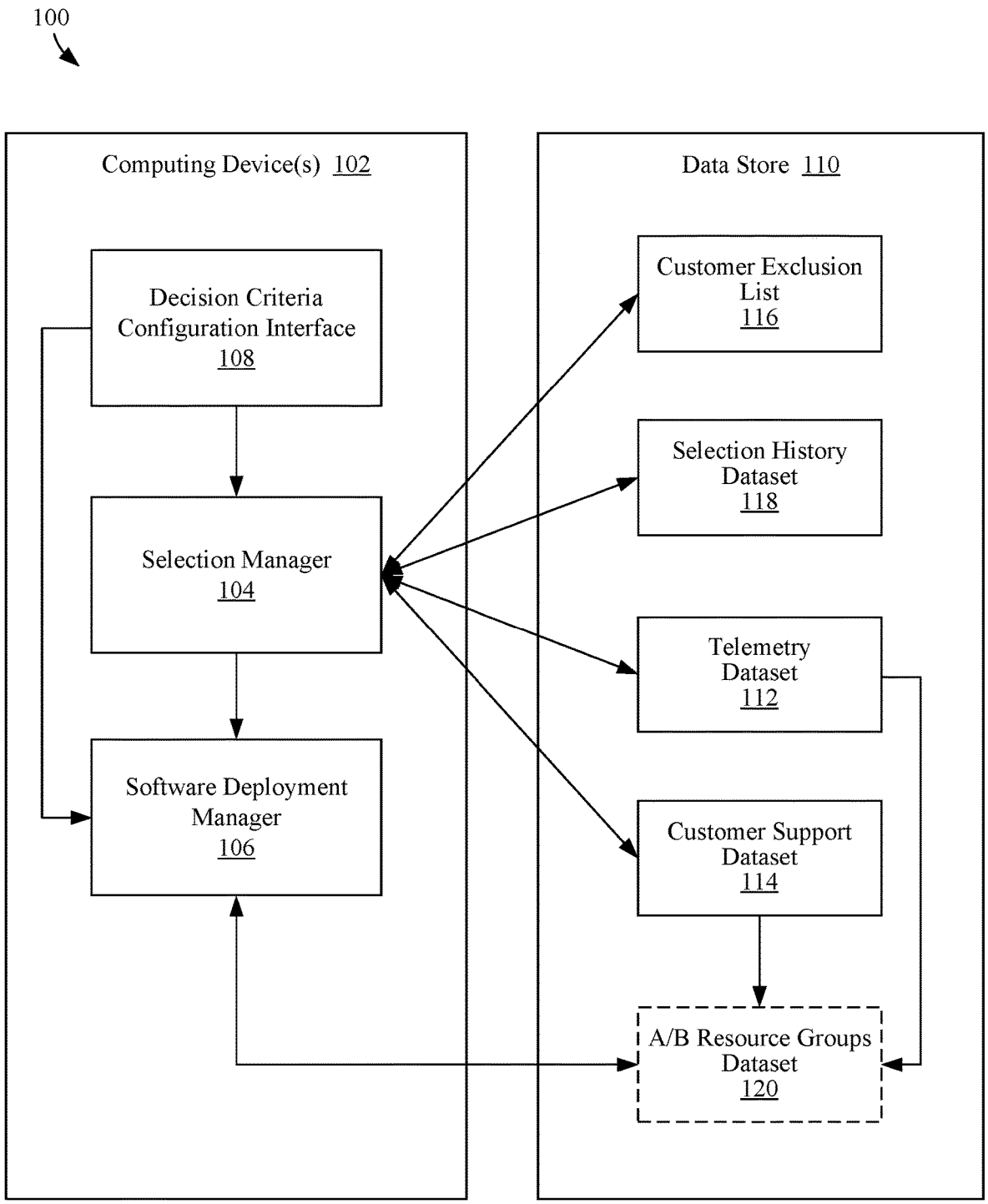
FIG. 1 is a block diagram of a system for dynamically selecting a cloud computing resource sample set for a software test, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

The present disclosure is related to testing software on resources deployed in a cloud computing system (e.g., in a production environment), where customers subscribe to services that provide access to the resources (e.g., a SQL database, an event streaming platform, an event processing platform, a data lake, etc.). The resources may vary depending on the type of cloud computing service being offered. Some types of cloud services include infrastructure as a service (IaaS), platform as a service (PaaS), and software as a service (SaaS), described in more detail below.

The present disclosure allows for testing a new software release in a limited deployment to a sample set of cloud computing resources. The selection of the sample set of resources is based on multiple criteria to (1) control the distribution of potential negative technical issues that may be caused by the new release among resources and customers, and (2) perform a more effective test of the new release where signals observed during the test provide a clear indication of the health of the new release. The new release may be deployed to a subset of customers that are selected based on criteria that distributes the negative effects of software issues or regression, which would escape traditional software development life cycle (SDLC) testing (e.g., feature testing, performance testing (based on known benchmarks), and stress testing (based on known or custom benchmarks)).

Software deployments in cloud computing environments are occurring at ever-increasing rates. At the same time, the complexity of the software products and the platforms being deployed continues to increase. These trends lead to less validation time available between deployments and increasingly complex validation structures. Without a carefully scheduled deployment model, the rapid deployment cycles along with the millions of workload varieties that can run in large scale cloud systems makes any new software issue or regression extremely costly. For example, those issues can cause damage to customer workloads and excessive down time, which can affect vendor credibility and revenue impact.

The present method provides a process for selecting a sample set of cloud computing resources for testing new software releases while reducing negative effects over a plurality of resources in a cloud computing system. The selection process utilizes, among other things, telemetry data and customer support data to systematically narrow down the population of resources eligible for running the new software in a particular software test. For the purpose of monitoring the system during the test and determining the test results, a sample set of resources selected for running a software test may be designated as a B resource group while other resources in the system may be designated as an A resource group.

Customer workloads that are active but not critical in a cloud system may be selected for testing software in order to reduce the degree of negative impacts that can be caused by the new software deployment. The method described herein may reduce the impact to high-touch customer jobs while gathering valuable data about the stability and performance of new software builds. Also, by avoiding the repeated selection of cloud resources subscribed to by the same set of customers, and avoiding deployment to resources of customers already having issues with their subscribed cloud resources, the risks associated with deployment of a new release may be spread among systems in a controlled safe manner. Moreover, customers may be filtered from the candidate customers for deployment based on user input. For example, a system administrator or engineer may maintain a customer exclusion list with regard to software testing participants.

Once a subset of cloud computing resources and customers are sorted based on these criteria, a sample set resources is selected for participation in the software test using a randomized process. This method provides selection fairness on top of targeting a variety of workload characteristics. The sample size or sampling rate may be selected to draw a critical mass sufficient for a clear software health signal.

The new software release is then deployed in a manner that allows for faster rollbacks if an issue is found, by having monitoring "watchdogs" auto-detect issues and generate reports. In some embodiments, the monitoring may be performed by measuring behavioral difference between before and after the limited software upgrade took place and by comparing test results in the sample set of resources with similar resources in the original selected set that were not selected by the randomized process.

Embodiments for implementing dynamic selection of cloud computing resources for a software test may be implemented in various ways. For example, FIG. 1 is a block diagram of a system 100 for dynamically selecting a cloud computing resource sample set for a software test in a manner that allows for effective system health signals during the test and controls the distribution of impact risk, according to an example embodiment.

As shown in FIG. 1, system 100 includes one or more computing devices 102 and a data store 110. Computing device(s) 102 include a selection manager 104, a software deployment manager 106, and a decision criteria configuration interface 108. Data store 110 stores a telemetry dataset 112, a customer support dataset 114, a customer exclusion list 116, a selection history dataset 118, and an A/B resource groups dataset 120. System 100 is described in detail as follows.

Computing device(s) 102 may comprise a single computing device or multiple computing devices. As described in more detail below with respect to FIG. 13, computing device(s) 102 may comprise any suitable computing device such as a stationary computing device (e.g., a desktop computer or personal computer), a mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system; a Microsoft® Windows phone, etc.), a wearable computing device (e.g., a head-mounted device including smart glasses such as Google® Glass™, Oculus Rift® by Oculus VR, LLC, etc.), a gaming console/system (e.g., Nintendo Switch®, etc.), an appliance, a set top box, etc.

Computing device(s) 102 may comprise one or more processors and one or more memory devices that store program code for execution by such processor(s) such as, among other things, selection manager 104, software deployment manager 106, and decision criteria configuration interface 108.

Selection manager 104 may be configured to select a sample set of resources from a plurality of cloud computing resources (e.g., databases, streaming engines, data lakes, etc.) for testing a software release before deploying the release to additional resources. The method of selection may rely on, among other things, dynamic telemetry and customer support information to control customer impact due to possible software issues during the test. Moreover the criteria used for selecting the resources may be configurable, for example, based on aspects of the software under test, the test workload, usage pattern data, etc. As such, test results may yield more reliable indicators of system health during execution of the software test. Selection manager 104 may be communicatively coupled to data store 110. Although data store 110 is shown as a single data store, in some embodiments, the datasets utilized by selection manager 104 (e.g., telemetry dataset 112, customer support dataset 114, customer exclusion list 116, and selection history dataset 118) may be stored in multiple data stores. For example, each of the datasets may be stored in its own separate medium.

Software deployment manager 106 may be configured to test a new software release that is deployed to a sample set of cloud computing resources. Software deployment manager 106 may be configured to designate the sample set of cloud computing resources as a B resource group for the software test process, and monitor A and B resource groups during the software test to determine whether or not the deployment was successful and next steps for deployment of the new software release.

Data store 110 may be communicatively coupled to selection manager 104, software deployment manager 106, and sources of telemetry data and/or customer support data as will be described in more detail below. Data store 110 may be configured to store one or more datasets which may be utilized by selection manager 104 to determine which resources to select for a software test and utilized by software deployment manager 106 to monitor results of the software test (e.g., an A/B type of software test).

Decision criteria configuration interface 108 may be configured to receive user input of configuration parameters, for example, by downloading a table or via a user interface (UI), such as a graphical UI (GUI). The decision criteria may be based on or defined by the configuration parameters and may be used by the selection manager 104 in selecting a candidate subset of the plurality of cloud computing resources to be included in a software test. For example, the configuration parameters may indicate which telemetry data and/or customer support data to retrieve for use in the resource selection process. Moreover, the configuration parameters may indicate which criteria to use for selecting the candidate subset of the plurality of resources. For example, selection criteria may comprise seasonality (e.g., when usage is scaled up or down), service-level objectives (e.g., how frequent resources are allocated per customer), workload types (e.g., batched versus streaming ingestion, etc.), which features are used in a resource (e.g., should resources using some features be filtered out of the selection or should resources using a wider variety of features be selected for a software test), etc.

In some embodiments, the selection criterion may be based on usage pattern data or other metrics of the cloud resources. The usage pattern data may vary depending on which type of cloud computing system is receiving the software deployment. For example, the usage pattern data may represent how many applications are running, how many resources are utilized, how much data is received (e.g., in a database), how much data is transmitted by a resource, etc.

In one embodiment, each cloud computing resource may comprise a database in an SQL database pool. For example, selection criteria configured for a database may be based on database usage pattern data, such as, how often a database is logged into over a time period, how many queries are run on the database, what types of queries or requests are received, or how much data is processed by the database over a time period. For example, the configured resource selection criteria may be based on telemetry data that may indicate a rate of trickle inserts and/or batch loads. In another example, the configured resource selection criteria may indicate selection of databases (i.e., resources) that receive greater than a specified number of queries per day, executed greater than a specified number of transformations within a database per day, and/or handled a specified level of data load per day or week. In some embodiments, one or more sets of the criteria may be configured in the cloud computing system via the decision criteria configuration interface 108, and a set of criteria may be configured for running a particular software test based on the type of resources and workloads used in the test, and/or the type of software being tested. In this manner, the criteria for resource selection may be tuned to yield a selection of resources having a workload that exercises the particular software under test at a degree of activity sufficient to generate signals that effectively predict the quality and the safety of a software deployment in a cloud computing system.

Figure 2:
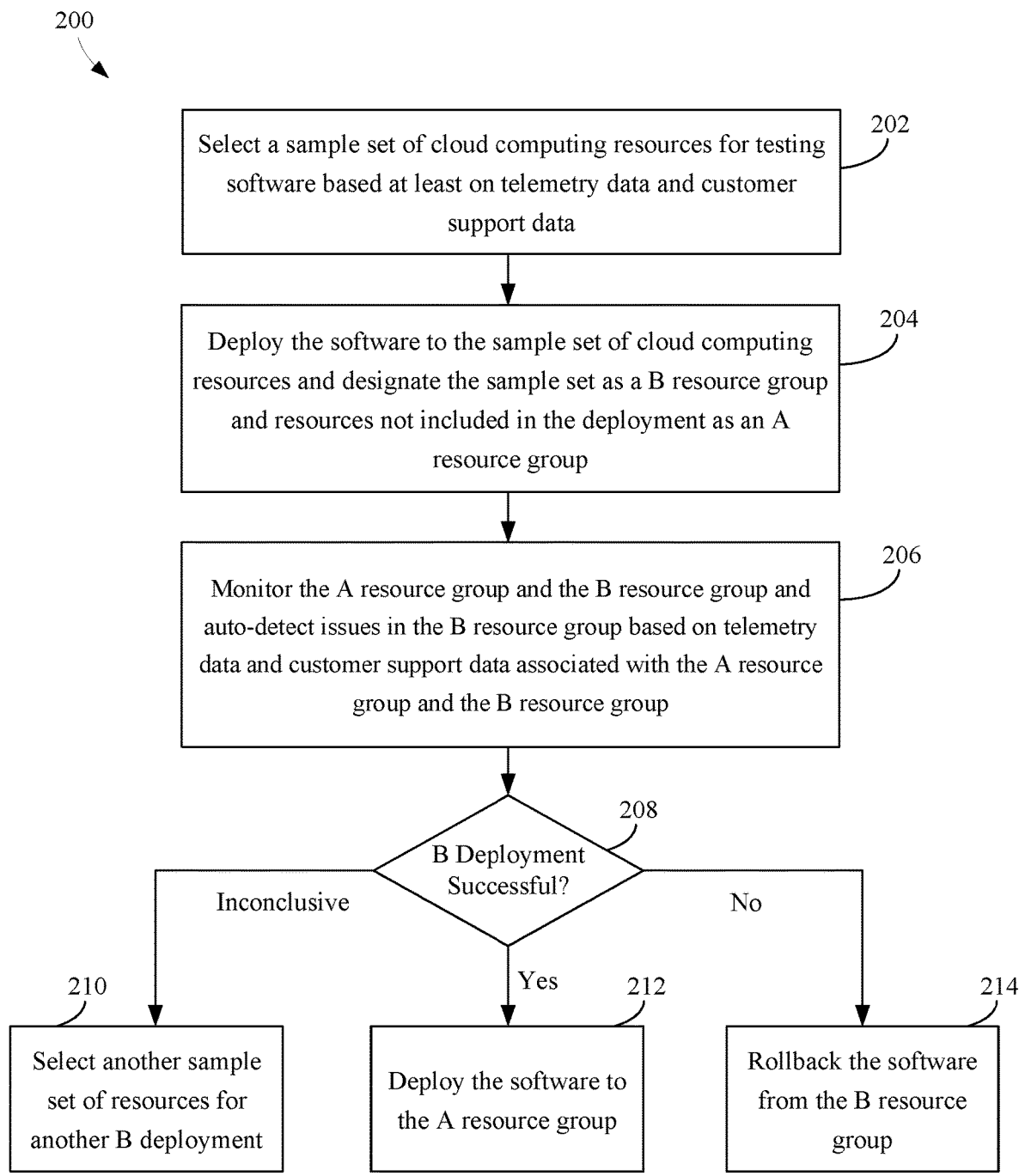
FIG. 2 is a flowchart of a method for dynamically selecting a cloud computing resource sample set for a software test and performing software deployment A/B testing based on the sample set, according to an example embodiment.

Computing device 102 may operate in various ways to perform its functions. For instance, FIG. 2 is a flowchart 200 of a method for dynamically selecting a cloud computing resource sample set for a software test and performing software deployment A/B testing based on the sample set, according to an example embodiment. In an embodiment, computing device 102 may operate according to flowchart 200. Flowchart 200 is described as follows with reference to FIGS. 1 and 3.

Figure 3:
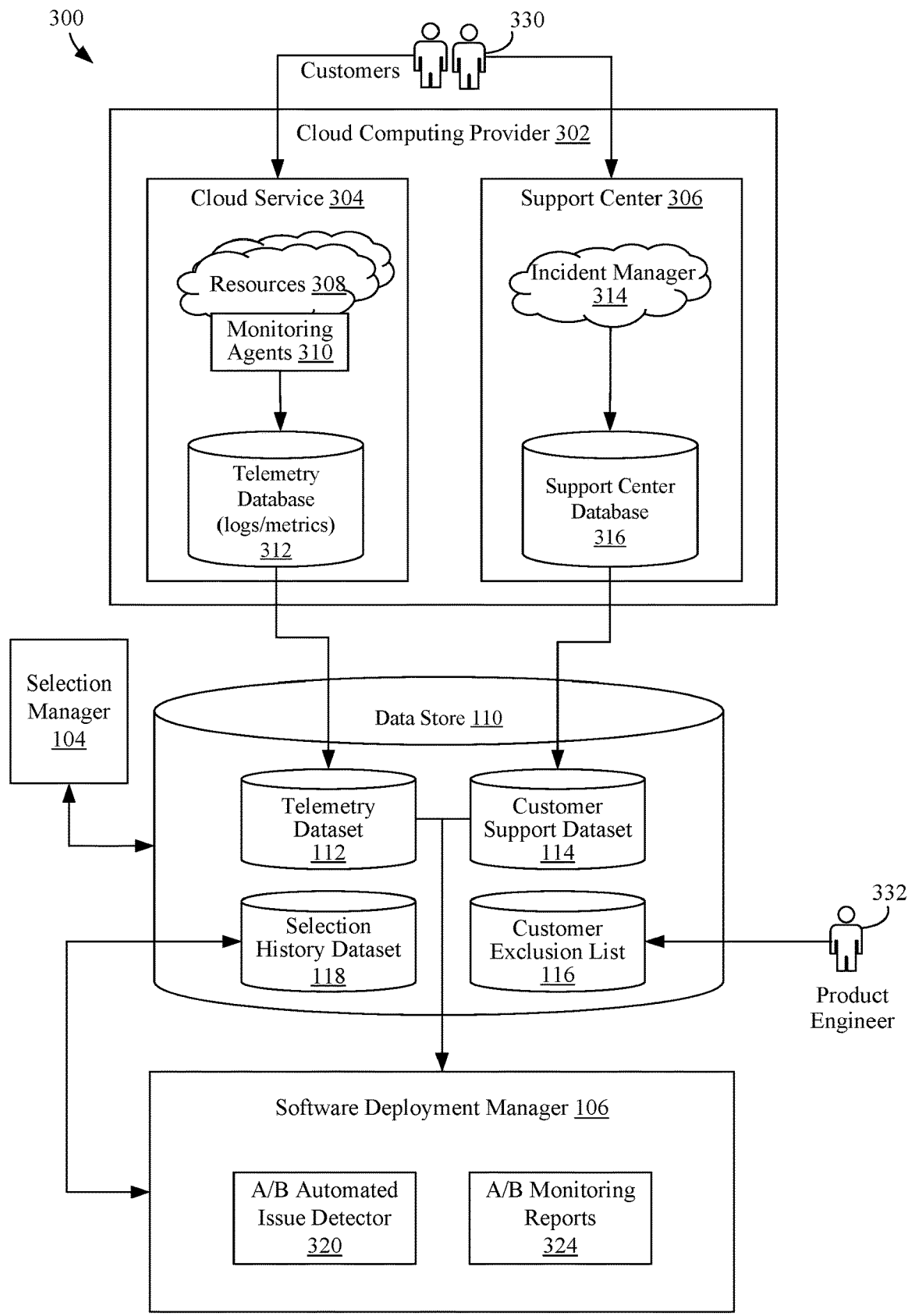
FIG. 3 is a block diagram of a system comprising telemetry and customer support data monitors for cloud computing resources that are utilized in the dynamic selection of a sample set of cloud computing resource to receive deployment of a new software release for A/B testing, according to an example embodiment.

FIG. 3 is a block diagram of a system 300 comprising telemetry and customer support data monitors for cloud computing resources that are utilized in the dynamic selection of a sample set of cloud computing resource to receive deployment of a new software release for A/B testing, according to an example embodiment. For example, system 300 comprises selection manager 104, software deployment manager 106, data store 110, telemetry dataset 112, customer support dataset 114, customer exclusion list 116, and selection history dataset 118. Software deployment manager 106 comprises an A/B automated issue detector 320 and A/B monitoring reports 324. System 300 also comprises a cloud computing provider 302, a cloud service 304, and a support center 306. Cloud service 304 comprises resources 308, monitoring agents 310, and a telemetry database 312. Support center 306 comprises an incident manager 314, and a support center database 316. Also shown in FIG. 3 are customers 330 and one or more product engineer(s) 332.

In some embodiments system 100 may be implemented as part of system 300. For purposes of illustration, systems 100 and 300 are described in detail as follows with respect to flowchart 200 of FIG. 2.

In general, resources 308 may comprise a population of cloud computing resources that may be considered for participation in a limited deployment of a new software release (e.g., components and/or features of a resource software package) for production testing of the new software release. Customers 330 may comprise a population of customers that may also be considered for participation in the testing of the new software release, where each of the customers 330 subscribes to cloud service 304, and each is associated with (or utilizes) one or more of the resources 308 according to their subscription. Some customers may have multiple subscriptions and each of their subscriptions may include one or more resources 308.

Flowchart 200 begins with step 202. In step 202, a sample set of cloud computing resources is selected for testing software based at least on telemetry data and customer support data. For example, selection manager 104 is configured to retrieve data from datasets in data store 110 including at least telemetry dataset 112 and customer support dataset 114 and select a subset of candidate resources 308 to participate in the software test (described in more detail below).

Telemetry dataset 112 may include service measurements collected from resources 308 and/or cloud service 304, and customer support dataset 114 may include customer support data received in incident manager 314 and/or support center 306. For example, cloud computing provider 302 may comprise one or more cloud services such as cloud service 304 subscribed to by customers 330. Cloud service 304 may comprise any suitable cloud service such as an IaaS, a PaaS, or a SaaS. Depending on the service provided, cloud service 304 may manage, and/or operate scalable resources 308 that may comprise cloud computing infrastructure, platforms, and/or software applications that customers 330 may subscribe to as a cloud service. Resources 308 may vary depending on the type of cloud computing service being offered. For example, resources 308 in an IaaS cloud type of service 304 may comprise managed physical information technology (IT) infrastructure. IaaS resources 308 may provide processing power and management capability (e.g., server clusters, processing cores, network equipment, storage, etc.). IaaS resources 308 may enable customers to create and customize virtual machines, virtualized servers, database systems, and network communications in the cloud. Customers with limited physical resources may subscribe to an IaaS cloud service 304 and quickly scale their systems as needed. Resources 308 in a PaaS type of cloud service 304 may include, for example, scalable operating systems, database management systems, business intelligence platforms, streaming engines, data lakes, etc. and may allow customers to develop, run, and/or manage applications in the cloud. Resources 308 in a SaaS type of cloud service 304 may include applications that may be subscribed to by customers 330 and delivered via the Internet. An SaaS cloud service 304 may manage access to the applications, security management, application availability, and application performance. Some SaaS resources 308 may include productivity applications, customer relations management tools, and online email services.

Monitoring agents 310 may log any suitable telemetry information such as service measurements or metrics from resources 308 and/or underlying infrastructure or platforms. The type of telemetry information collected may depend on the type of resources 308 being monitored. Monitoring agents 310 may transmit the telemetry information to telemetry database 312. The telemetry information may include, for example, measurements or metrics for event details captured during processing or transaction steps, timer states, performance information, system states, usage information, activity levels, loading levels, transaction details, failures, etc. In some embodiments, the telemetry information utilized by selection manager 104 and/or software deployment manager 106 may be stored as telemetry dataset 112 in data store 110.

Users such as customers 330, customer support administrators, product engineer 332, etc., may enter or report information regarding issues with resources 308 and/or cloud service 304 via a user interface for incident manager 314 in support center 306. In some embodiments, the users may create tickets comprising customer support data in incident manager 314. The customer support data may be stored in support center database 316. The customer support data may provide information about events that might lead to, or may have caused, disruption to or loss of operations in resources 308 or cloud services 304. In general, the customer support data may be utilized to identify, analyze, correct, or prevent problems in cloud service 304 and/or resources 308. Customer support data that may be utilized by selection manager 104 to select resources for software testing, may be processed and stored as customer support dataset 114 in data store 110.

In some embodiments, data store 110 may comprise an analytic database that may monitor and/or process telemetry data from telemetry database 312 and support center database 316, and store the data in telemetry dataset 112 and customer support dataset 114 respectively for use by selection manager 104 and/or software deployment manager 106.

Data store 110 may also store selection history dataset 118 that may be used by selection manager 104 to identify resources that have previously been selected for participation in a software test to avoid repeated use of the same resources in software testing. Selection history dataset 118 may be updated by software deployment manager 106 to indicate that resources in a sample set of resources 308 have been selected for participation in a software test.

Data store 110 may also store customer exclusion list 116 that may be utilized by selection manager 104 to identify customers having known circumstances that preclude them from being selected for participating in a software test (e.g., the customers may participate in pre-arranged software deployment programs). In some embodiments, customer exclusion list 116 may be maintained by an administrator such as product engineer 332.

In some embodiments, resources 308 may comprise databases in an SQL database management system. Data store 110 may comprise an analytic database that may monitor and/or process telemetry data from telemetry database 312 and support center database 316, and store the data in telemetry dataset 112 and customer support dataset 114 respectively for use in selecting a portion of resources 308 for participation in a software test. Telemetry dataset 112 may include telemetry data such as database login information (e.g., how many logins occurred over time, how many logins were successful and/or failed), query information (e.g., how many queries occurred over time, how many queries were successful and/or failed, query metadata about the types of queries received), data insertion events, data retrieval metadata (e.g., which data sources were read from, what kind of aggregate queries were run). Internal metrics may also be stored in telemetry dataset 112 (e.g., how many process crashes occur over time, what type of crashes occur, CPU utilization, I/O delays, memory usage, etc.). Telemetry dataset 112 may also include information about changes in capacity, for example, with respect to scaling of resources 308 and/or provisioned processing cores, scaled up or down (e.g., small or large provision instances).

Once a candidate subset of resources 308 are selected by selection manager 104, selection manager 104 may utilize a randomization method to select a sample set of cloud computing resources 308 from the candidate subset for use in testing the software (e.g., as in a limited deployment of a new software release in a production environment).

Returning now to the description of flowchart 200, in step 204, the software is deployed to the sample set of cloud computing resources and the sample set is designated as a B resource group. A set of resources not included in the deployment are designated as an A resource group. For example, a new release of software to be tested, may be deployed to the randomly selected sample set of cloud computing resources 308. Software deployment manager 106 may be configured to identify resources 308 that receive the new software release (i.e., belong to the randomly selected sample set) as a B resource group resources 308, and identify certain resources 308 that did not receive the new release of software as the A resource group resources 308. The A resource group may include resources that were selected as part of the candidate subset of resources 308 but were not randomly selected as part of the sample set, or may include a broader set of resources 308 that were not selected as part of the sample set.

In step 206, the A resource group and the B resource group are monitored and issues in the B resource group are auto-detected based on telemetry data and customer support data associated with the A resource group and the B resource group. For example, the new software release may run in the B resource group resources 308 for a "baking period," during which the A resource group resources 308 and the B resource group resources 308 are monitored. Telemetry data is logged and customer support data is received for both groups and stored in telemetry database 312 and support center database 316 respectively.

Various criteria for determining the success or failure of the software test may be defined in software deployment manager 106 based on specified telemetry data and/or customer support data metrics. The specified telemetry data and customer support data metrics may be transmitted to data store 110 and stored in A/B resource groups dataset 120, and/or it may be stored in telemetry data 112 and customer support dataset 114.

Software deployment manager 106 may be configured to monitor the specified telemetry data and customer support data metrics associated with the A resource group resources 308 and the B resource group resources 308, and determine the results of the software test of the deployed new software release in the B resource group resources 308. For example, A/B automated issue detector 320 may be configured to analyze the specified telemetry data and customer support data metrics associated with the B resource group based on the defined criteria to find potential new issues caused by the new software in the B resource group resources. In some embodiments, A/B monitoring reports 324 may be generated for review by a user such as product engineer 332. For example, the telemetry data and/or customer support data metrics may be aggregated for visual consumption via the reports.

The data monitored may depend on the type of cloud computing service and/or resources running the new software release under test. For example, when the resources 308 comprise databases, the software test results may be based on whether (1) an increase in, or new, process crash signatures are observed in the B resource group resources 308, (2) specific increases in, or new, system error codes (e.g., for internal failures) are returned to the customer for the B resource group resources 308, (3) a significant negative change in resource usage is observed in the B resource group resources 308, (4) performance related issues are observed in the B resource group resources 308, or (5) features systematically fail in the B resource group resources 308. In general, software test metrics comparisons may cover metrics before and after the deployment to the B resource group and metrics in A to B group comparisons.

In step 208, in instances when results of the software deployment to the B resource group are inconclusive, the method may proceed to step 210. In step 210, another sample set of resources may be selected for another B deployment software test. For example, in step 206, when software deployment manger 106 and/or user observation is unable to determine whether the new software release failed or passed the test, steps 202-206 may be repeated for testing the new software release in a different sample set of cloud computing resources from the plurality of resources 308.

In step 208, in instances when results of the software deployment to the B resource group are successful, control flows to step 212. In step 212, the software is deployed to the A resource group. For example, in step 206, when software deployment manager 106 and/or user observation determines that the deployment of the new software release in the B resource group resources 308 is successful, the new software release may be deployed in the A resource group resources 308, and/or in additional resources.

In step 208, in instances when results of the deployment to the B resource group are not successful, control flows to step 214. In step 214, the software deployment to the B resource group is rolled back. For example, in step 206, when software deployment manager 106 and/or user observation determines that the deployment of the new software release in the B resource group resources 308 has failed, the new software release may be rolled back from the B resource group resources 308 to a previous release. In this manner, performance risks associated with the new software release may be mitigated.

Figure 4:
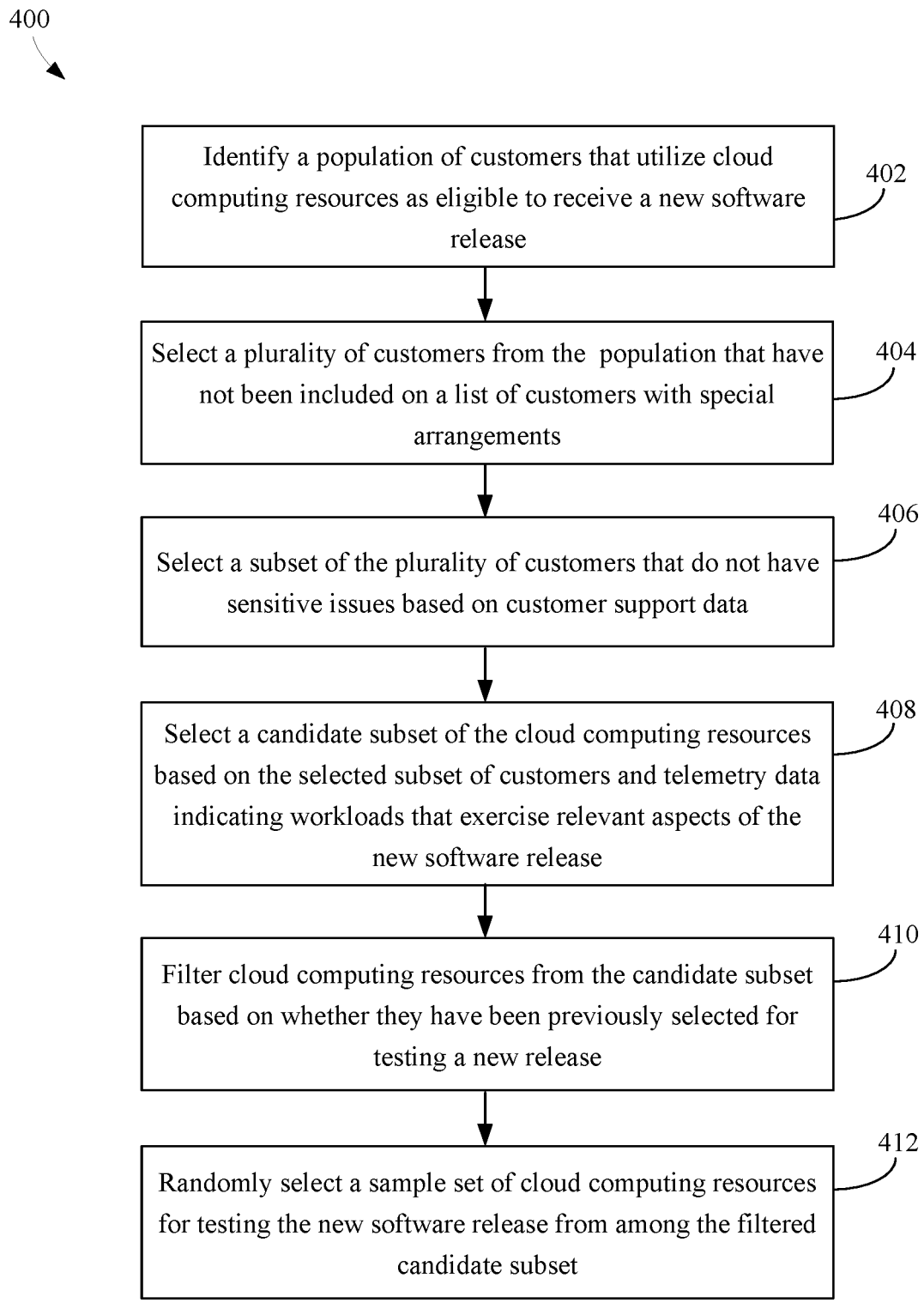
FIG. 4 is a flowchart of a method for dynamically selecting a cloud computing resource sample set for testing software based on telemetry data and customer support data, according to an example embodiment.

Selection manager 104 may operate in various ways to perform its functions. For instance, FIG. 4 is a flowchart 400 of a method for dynamically selecting a cloud computing resource sample set for testing software based on telemetry data and customer support data, according to an example embodiment. In some embodiments, flowchart 400 may be performed as part of flowchart 200 (FIG. 2), such as in step 202. In an embodiment, selection manager 104 may operate according to flowchart 400. Flowchart 400 is described as follows with reference to FIGS. 1 and 3.

Flowchart 400 begins with step 402. In step 402, a population of customers that utilize cloud computing resources is identified as eligible to receive a new software release. For example, a new software release (e.g., new or modified software components) may be developed for resources in a cloud service, such as resources 308 in cloud service 304. As described above, cloud service 304 may comprise an IaaS, a PaaS, an SaaS, etc. Depending on the type of cloud service, resources 308 may include, for example, server clusters, processing cores, network equipment, storage devices, operating systems, database management systems, business intelligence platforms, streaming engines, data lakes, or software applications such as security management software, productivity applications, customer relations management tools, online email services, etc. A population of customers (e.g., customer 330) that subscribe to cloud service 304 and utilize resources 308 may be identified (e.g., by product engineer 332 or a system administrator) in cloud service 304 as eligible to receive the new software release developed for resources 308, and thus, may be selected from for possible inclusion in a software test.

In step 404, a plurality of customers from the population that have not been included on a list of customers with special arrangements may be selected. For example, product engineer 332 may maintain a list or table in customer exclusion list 116 that indicates which customers 330 of the population of customer 330 are deemed not eligible to participate in production testing of new software in the resources 308 that are allocated to their cloud service 304 subscription. For example, in some embodiments, a customer may be included in the exclusion list because they have a special agreement or relationship with the cloud computing provider 302. The customer may run sensitive workloads and/or have agreed upon deployment programs such as an early deployment program for identified "canary" resources. Due to their sensitivity, they are filtered from the population of eligible customers 330 for selection as a candidate for testing the new software release. For example, in some embodiments, selection manager 104 may be configured to select a plurality of customers 330, which are not included in the customer exclusion list 116, for further consideration as a candidate for participating in testing of the new software release.

In step 406, a subset of the plurality of customers that do not have sensitive issues based on customer support data are selected. For example, selection manager 104 may be configured to retrieve and analyze data from customer support dataset 112 and select a subset of the plurality of customers 330 for participation in the new software release test. In this manner, resources 308 utilized by customers 330 having sensitive issues (e.g., as determined based on service tickets created by the customers or product engineers) may be eliminated from participation in the software test. These customers, may have already had an unsatisfactory experience with cloud service 104. By eliminating the resources 308 that they utilize, from the software test, their risk of having another bad experience is reduced. This may apply to resources 308 utilized under all of the customer's subscriptions or only under specified subscriptions of the customer (e.g. a subscription of a department within the customer's organization).

In step 408, a candidate subset of the cloud computing resources is selected based on the selected subset of customers and telemetry data indicating workloads that exercise relevant aspects of the new software release. For example, selection manager 104 may be configured to retrieve and analyze data from telemetry dataset 114 for resources 308. In some embodiments, the analyzed data may be associated with the selected subset of the plurality of customers 330 that are not included in the exclusion list (as determined in step 404) and do not have sensitive issues (as determined in step 406). Selection manager 104 may be configured to select a candidate subset of resources 308 for participation in the software test based on the analysis of the data of the telemetry dataset 112.

In general, selection manager 104 may analyze usage pattern data for resources 308 and/or cloud service 304. The usage pattern data may indicate, for example: types of operations performed, successful or failed operations, durations of operations, resources utilized by the operations, the scale at which resources are operating, times of operations, sleep and un-sleep times, activity levels, etc. The usage pattern data may be utilized by selection manager 104 to determine which of the resources 308 are good candidates for testing software, such as the particular software release to be tested. For example, as described in more detail above, decision criteria that selection manager 104 may utilize for selecting a candidate subset of resources 308 to be included in a software test, may be defined by configuration parameters pertaining to one or more of telemetry dataset 112, customer support dataset 114, usage pattern data, resources 308 (and/or workloads thereof), aspects of the software being tested, etc. The decision criteria may be configured utilizing configuration parameters entered by a user (e.g., product engineer 332, a system administrator, etc.) via decision criteria configuration interface 108. In this manner, a candidate subset of cloud computing resources 308 that may be selected for participation in a software test, may carry a workload that exercises the software under test at a degree of, and type of, activity that is sufficient to generate signals that effectively indicate (i.e., predict) the quality and the safety of the software for further deployment.

In some embodiments, customer usage history data may comprise usage information of telemetry dataset 112 that is correlated with data from customer support data 114 that is associated with support tickets acted on by a support team. The correlated data may be merged in data store 110 for long-term retention and may be utilized in the selection of resources 308 for participating in the software test.

In step 410, cloud computing resources may be filtered from the candidate subset based on whether they have been previously selected for testing a new release. For example, selection manager 104 may be configured to query selection history dataset 118 to identify resources 308 that previously participated in a software test or were selected for participating in a software test. For example, selection manager 104 may avoid selecting a resource from resources 308 multiple times in a row, or that has been selected in the prior N selection cycles, or in the past X number of days, weeks, or months, etc. In this manner, the risks associated with testing software (e.g., service problems, losing data, having to back-out software, customer pain, etc.) may be load-balanced among resources 308 and/or customers 330. As described above, selection history dataset 118 may be updated by selection manager 104 or software deployment manager 106 once a sample set of resources 308 has been selected for participating in a software test or has participated in a software test.

In step 412, a sample set of cloud computing resources may be randomly selected for testing the new software release from among the filtered candidate subset. For example, after selecting the candidate subset of the cloud computing resources for testing in the new software release, selection manager 104 may be configured to utilize a method of random selection to select a sample set of cloud computing resources 308 from among the candidate subset of cloud computing resources 308 for testing the new software release (e.g., a limited software deployment). In this regard, the selected candidate subset of cloud computing resources 308 has been selected based on, at least, telemetry data and customer support data such that the risk of service problems (e.g., software issues, regression, software back-out, etc.) is load balanced, and the workloads of the candidate subset are capable of sufficiently generating health signals for the software under test, for further deployment. By randomly sampling a subset of the candidate subset of cloud computing resources 308, a useful but reduced number of resources (e.g., a critical mass) may participate in the software test, and the next time a software test is needed for the same population of resources, another random sample may be selected from the candidate subset of the plurality of resources 308.

Although the steps 402-410 of flowchart 400 are shown in a particular order, the order of performing these steps may be rearranged into any alternative order. For example, each of the steps 402-410 may be considered a filter for filtering-out a portion of the total population of resources 308, from being included in the new software release test. The order of these filters may be rearranged, or the filters may be combined to arrive at a subset of the total population of resources 308 for the random selection method in step 412.

Figure 5:
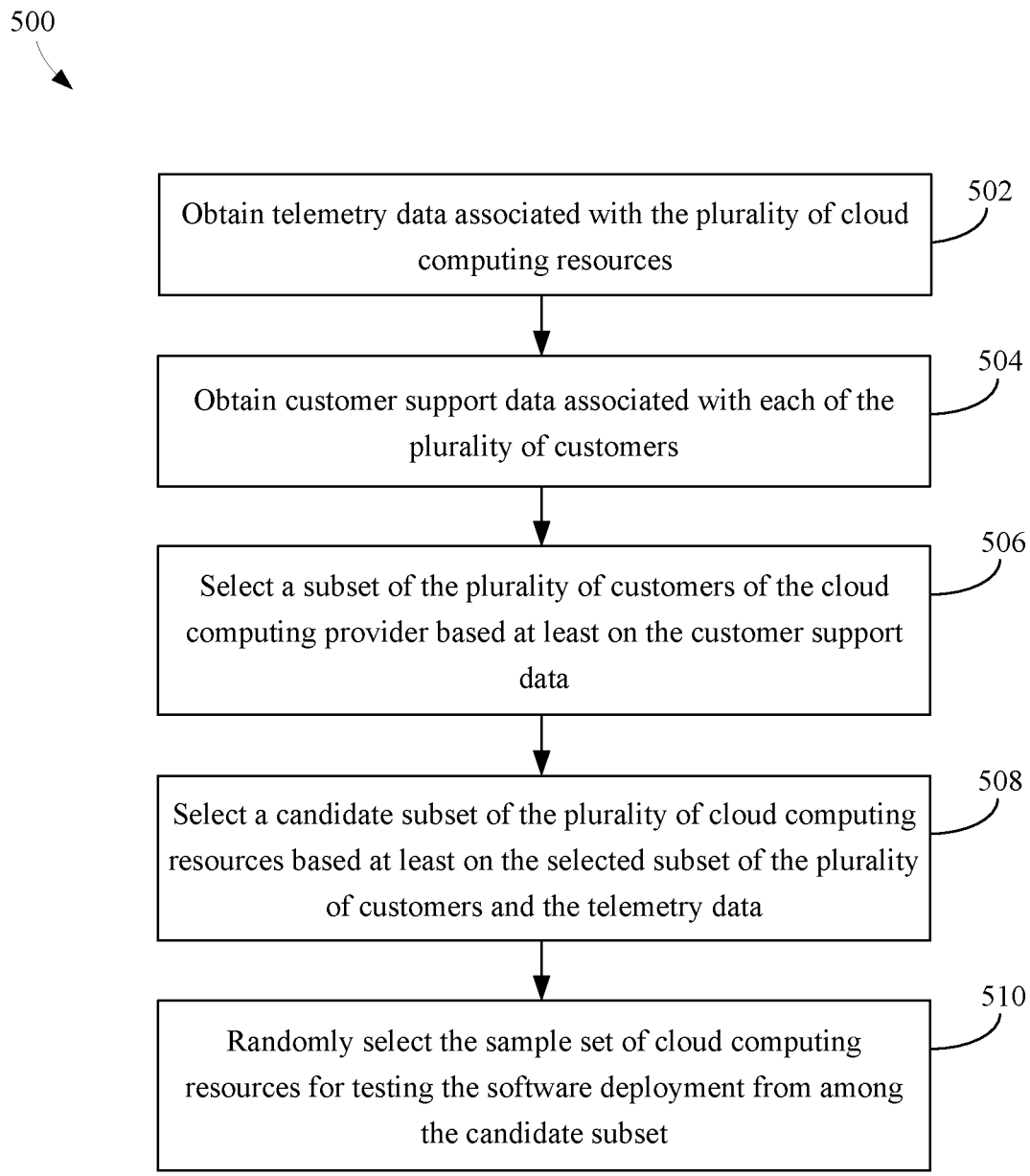
FIG. 5 is a flowchart of a method for dynamically selecting a cloud computing resource sample set for software deployments based on telemetry data and customer support data, according to an example embodiment.

In one embodiment, selection manager 104 may operate in various ways to perform its functions. For instance, FIG. 5 is a flowchart 500 of a method for dynamically selecting a cloud computing resource sample set for software deployments based on telemetry data and customer support data, according to an example embodiment. In some embodiments, flowchart 500 may be performed as part of flowchart 200 (FIG. 2), such as in step 202, or as part of flowchart 400 (FIG. 4), such as after step 402. In an embodiment, selection manager 104 may operate according to flowchart 500. Flowchart 500 is described as follows with reference to FIGS. 1 and 3.

Flowchart 500 includes step 502. In step 502, telemetry data associated with the plurality of cloud computing resources may be obtained. For example, selection manager 104 may be configured to retrieve telemetry data for the plurality of resources 308 from telemetry data set 112.

In step 504, customer support data associated with each of the plurality of customers may be obtained. For example, selection manager 104 may be configured to retrieve customer support data associated with the plurality of customers 330 (e.g., customers who utilize resources 308 according to their cloud service 304 subscription) from customer support dataset 114.

In step 506, a subset of the plurality of customers of the cloud computing provider may be selected based at least on the customer support data. For example, selection manager 104 may be configured to analyze the customer support dataset 114 and select a subset of the plurality of customers 330 for participation in testing of software in resources 308 that are utilized by or associated with the selected subset of the plurality of customers 330 according to their cloud computing subscriptions.

In step 508, a candidate subset of the plurality of cloud computing resources may be selected based at least on the selected subset of the plurality of customers and the telemetry data. For example, selection manager 104 may be configured to select a candidate subset of the plurality of resources 308 for participation in the software test based on resources 308 that are utilized by or associated with the selected subset of the plurality of customers 330 according to their cloud computing subscriptions and the analysis of the data retrieved from telemetry dataset 112.

In step 510, the sample set of cloud computing resources may be randomly selected for testing the software deployment from among the candidate subset. For example, selection manager 104 may be configured to utilize a method of random selection to select a sample set of cloud computing resources 308 from the selected candidate subset of the plurality of resources 308 for testing the new software release (i.e., to receive the new software deployment for A/B testing).

Figure 6:
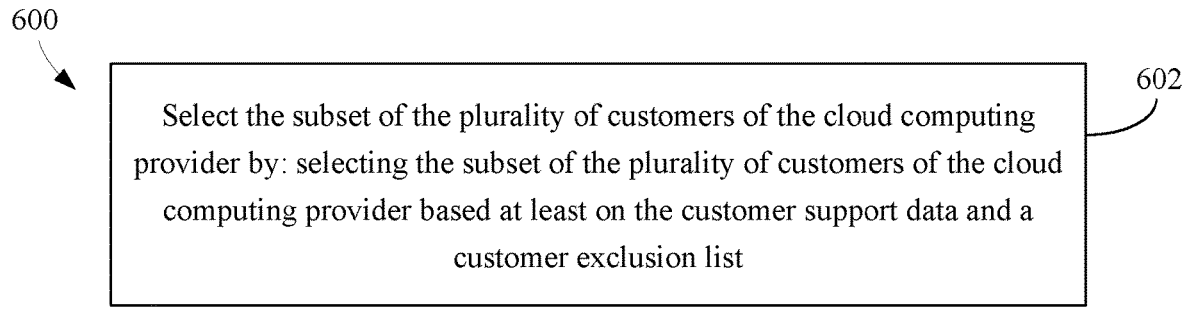
FIG. 6 is a flowchart of a method for selecting a subset of customers of a cloud computing provider based on a customer exclusion list, according to an example embodiment.

Selection manager 104 may operate in various ways to perform its functions. For instance, FIG. 6 is a flowchart of a method for selecting a subset of customers of a cloud computing provider based on a customer exclusion list, according to an example embodiment. Flowchart 600 may be performed as part of flowchart 500 (FIG. 5), such as before step 510. In an embodiment, selection manager 104 may operate according to flowchart 600. Flowchart 600 is described as follows with reference to FIGS. 1 and 3.

Flowchart 600 includes step 602. In step 602, the subset of the plurality of customers of the cloud computing provider may be selected by: selecting the subset of the plurality of customers of the cloud computing provider based at least on the customer support data and a customer exclusion list. For example, selection manager 104 may be configured to obtain customer exclusion list 116 that indicates which of the plurality of customers 330 are ineligible to participate in production testing of new software (described above). In some embodiments, product engineer 332 may maintain the customer exclusion list 116. Selection manager 104 may be configured to select the subset of the plurality of customers 330 based on the analysis of the customer support dataset 114 and the customer exclusion list 116.

Figure 7:
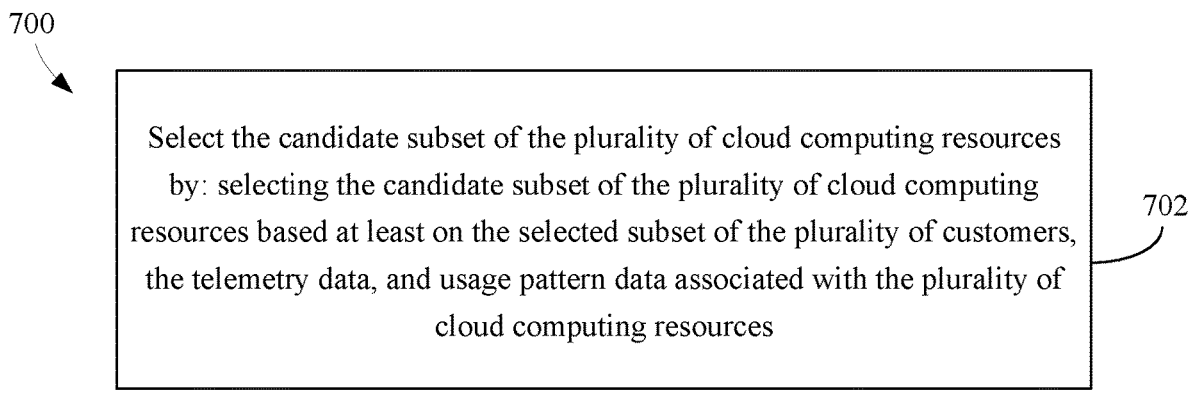
FIG. 7 is a flowchart of a method for selecting a candidate subset of cloud computing resources based on a selected subset of customers, telemetry data, and usage pattern data, according to an example embodiment.

Selection manager 104 may operate in various ways to perform its functions. For instance, FIG. 7 is a flowchart of a method for selecting a candidate subset of cloud computing resources based on a selected subset of customers, telemetry data, and usage pattern data, according to an example embodiment. Flowchart 700 may be performed as part of flowchart 500 (FIG. 5), such as before step 510. In an embodiment, selection manager 104 may operate according to flowchart 700. Flowchart 700 is described as follows with reference to FIGS. 1 and 3.

Flowchart 700 includes step 702. In step 702, the candidate subset of the plurality of cloud computing resources may be selected by: selecting the candidate subset of the plurality of cloud computing resources based at least on the selected subset of the plurality of customers, the telemetry data, and usage pattern data associated with the plurality of cloud computing resources. For example, selection manager 104 may be configured to analyze usage pattern data (described above) indicated in the telemetry dataset 112 for the plurality of resources 308 and select the candidate subset of the plurality of resources 308 based on the selected subset of the plurality of customers 330, the telemetry dataset 112, and the analysis of the usage pattern data.

Figure 8:
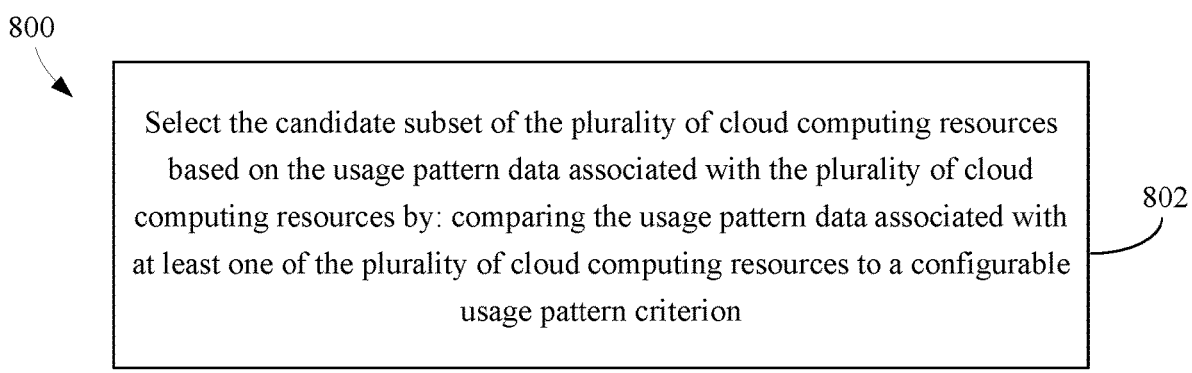
FIG. 8 is a flowchart of a method for selecting a candidate subset of cloud computing resources based on a configurable usage pattern criterion, according to an example embodiment.

Selection manager 104 may operate in various ways to perform its functions. For instance, FIG. 8 is a flowchart 800 of a method for selecting a candidate subset of cloud computing resources based on a configurable usage pattern criterion, according to an example embodiment. Flowchart 800 may be performed as part of flowchart 700 (FIG. 7), such as during step 702. In an embodiment, selection manager 104 may operate according to flowchart 800. Flowchart 800 is described as follows with reference to FIGS. 1 and 3.

Flowchart 800 includes step 802. In step 802, the candidate subset of the plurality of cloud computing resources may be selected based on the usage pattern data associated with the plurality of cloud computing resources by: comparing the usage pattern data associated with at least one of the plurality of cloud computing resources to a configurable usage pattern criterion. For example, at least one usage pattern criterion may be defined by configuration parameters pertaining to telemetry dataset 112, customer support dataset 114, and/or workloads of the resources 308. The configuration parameters may be entered a user (e.g., product engineer 332, a system administrator, etc.) via decision criteria configuration interface 108. Selection manager 104 may be configured to select the candidate subset of the plurality of cloud computing resources 308 based on the usage pattern data associated with the plurality of cloud computing resources 308 by comparing the usage pattern data associated with at least one of the plurality of cloud computing resources 308 to the at least one configurable usage pattern criterion.

Figure 9:
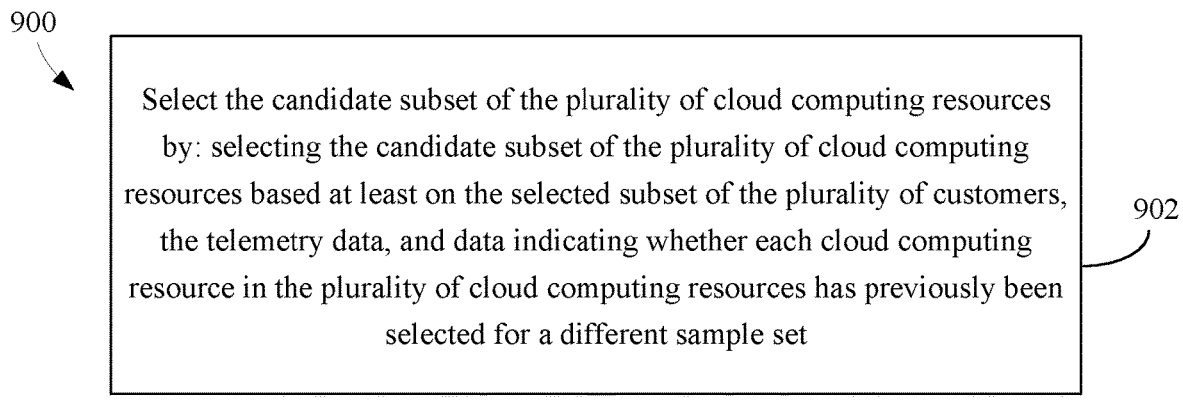
FIG. 9 is a flowchart of a method for considering selection history when selecting a candidate subset of cloud computing resources for software deployment testing, according to an example embodiment.

Selection manager 104 may operate in various ways to perform its functions. For instance, FIG. 9 is a flowchart 900 of a method for considering selection history when selecting a candidate subset of cloud computing resources for software deployment testing, according to an example embodiment. Flowchart 900 may be performed before step 510 of flowchart 500 (FIG. 5), for example. In an embodiment, selection manager 104 may operate according to flowchart 900. Flowchart 900 is described as follows with reference to FIGS. 1 and 3.

Flowchart 900 includes step 902. In step 902, the candidate subset of the plurality of cloud computing resources may be selected by: selecting the candidate subset of the plurality of cloud computing resources based at least on the selected subset of the plurality of customers, the telemetry data, and data indicating whether each cloud computing resource in the plurality of cloud computing resources has previously been selected for a different sample set. For example, selection manager 104 may be configured to analyze the selection history dataset 118 and identify resources 308 that have previously been selected for participation in a software test (described above). Selection manager 104 may be configured to select the candidate subset of the plurality of resources 308 based on the selected subset of the plurality of customers 330, the telemetry dataset 112, and the identified resources 308 that have been previously selected for participation in a software test. In this regard, the identified resources 308 may be excluded from the selection of the candidate subset of the plurality of cloud computing resources 308.

Figure 10:
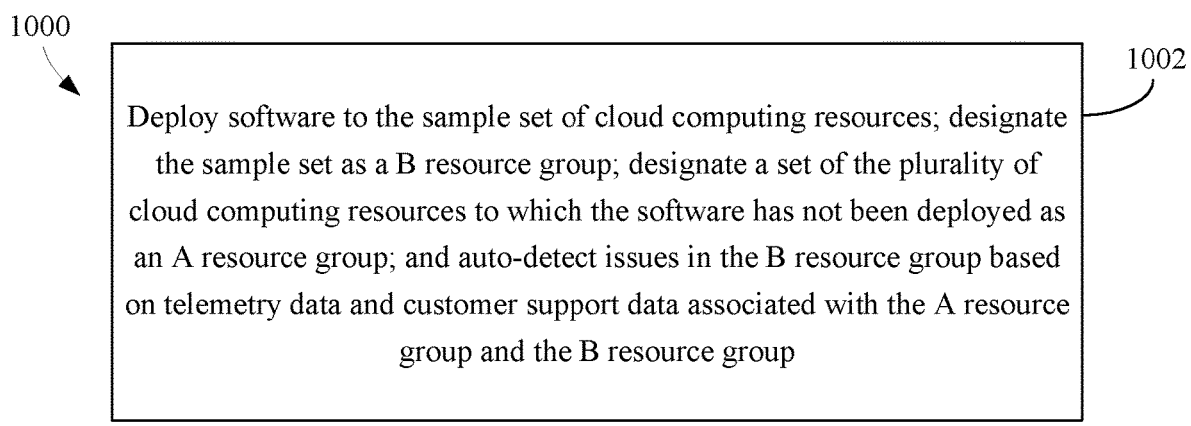
FIG. 10 is a flowchart of a method for auto-detecting issues based on telemetry data and customer support data during A/B testing of a sample set of cloud computing resources, according to an example embodiment.

Software deployment manager 106 may operate in various ways to perform its functions. For instance, FIG. 10 is a flowchart 1000 of a method for auto-detecting issues based on telemetry data and customer support data during A/B testing of a sample set of cloud computing resources, according to an example embodiment. Flowchart 1000 may be performed after step 510 of flowchart 500 (FIG. 5), for example. In an embodiment, software deployment manager 106 may operate according to flowchart 1000. Flowchart 1000 is described as follows with reference to FIGS. 1 and 3.

Flowchart 1000 includes step 1002. In step 1002, software may be deployed to the sample set of cloud computing resources, the sample set may be designated as a B resource group, a set of the plurality of cloud computing resources to which the software has not been deployed may be designated as an A resource group, and issues in the B resource group may be auto-detected based on telemetry data and customer support data associated with the A resource group and the B resource group. For example, where the new software is deployed to the sample set of cloud computing resources 308 for conducting the software testing, software deployment manager 106 may be configured to designate the sample set as a B resource group, designate a set of the plurality of cloud computing resources 308 to which the new software has not been deployed as an A resource group, and auto-detect issues in the B resource group based on telemetry dataset 112 and customer support dataset 114 that are associated with the A resource group and the B resource group. As described in more detail above, A/B automated issue detector 320 of software deployment manager 106 may be configured to perform the auto-detection of the issues during or after the software testing.

This method of deploying a new software release for testing purposes, allows for faster software rollbacks when an issue is found. Monitoring in the software test may be performed by measuring behavioral differences between before and after the software was deployed to the sample set of resources 308, and by comparing test results in the sample set of resources 308 (the B group) with an A group comprising (1) similar resources that may have been included in the selected candidate subset of resources 308 and that were not selected by the randomized process, or (2) a broader group of the resources 308 or customers 330 that were not selected for participation in the software test.

Software deployment manager 106 may operate in various ways to perform its functions. For instance, FIG. 11 is a flowchart 1100 of a method for conducting A/B testing of a software deployment to a sample set of cloud computing resources based on telemetry data and customer support data, according to an example embodiment. Flowchart 1100 may be performed during step 1002 of flowchart 1000 (FIG. 10), for example. In an embodiment, Software deployment manager 106 may operate according to flowchart 1100. Flowchart 1100 is described as follows with reference to FIGS. 1 and 3.

Flowchart 1100 includes step 1102. In step 1102, at least one of the following may be identified based on the telemetry data and the customer support data associated with the A resource group and the B resource group: resource process crash signatures of the B resource group, an increase in system error codes returned to one or more customers associated with the B resource group, new system error codes returned to one or more customers associated with the B resource group, a negative change in resource usage in the B resource group, performance-related issues in the B resource group, systematic feature failures in the B resource group, or customer-reported problems associated with the B resource group. For example, during or after the software testing, software deployment manager 106 may be configured analyze A/B resource groups dataset 120 (and/or telemetry dataset 112 and customer support dataset 114 directly) and identify resource process crash signatures of the B resource group, an increase in system error codes returned to one or more customers 330 that are associated with the B resource group, new system error codes returned to one or more customers 330 that are associated with the B resource group, a negative change in resource usage in the B resource group, performance-related issues in the B resource group, systematic feature failures in the B resource group, or customer-reported problems associated with the B resource group.

Selection manager 104 may operate in various ways to perform its functions. For instance, FIG. 12 is a flowchart 1200 of a method for responding to the results of A/B testing of a sample set of cloud computing resources, according to an example embodiment. Flowchart 1200 may be performed after step 1002 of flowchart 1000 (FIG. 10), for example. In an embodiment, software deployment manager 106 may operate according to flowchart 1200. Flowchart 1200 is described as follows with reference to FIGS. 1 and 3.

Flowchart 1200 begins with step 1202. In step 1202, at least one of the following is performed based on the telemetry data and the customer support data associated with the A resource group and the B resource group: cause another sample set of cloud computing resources to be selected for retesting the software deployment, deploy the software to additional resources of the plurality of cloud computing resources, or roll back the deployment of the software from the sample. For example, after conducting the software testing, software deployment manager 106 may be configured to perform at least one of the following based on telemetry dataset 112 and customer support dataset 114 that are associated with the A resource group and the B resource group: cause another sample set of cloud computing resources 308 to be selected for retesting the software deployment (e.g., in instances when the software test fails), deploy the software to additional resources 308 of the plurality of cloud computing resources 308 (e.g., in instances when the software testing is successful), or roll back the deployment of the software from the sample set of cloud computing resources 308 (e.g., in instances when the software test has failed).

III. Example Computer System Implementation

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, systems 100 and 300 along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/ or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 13:
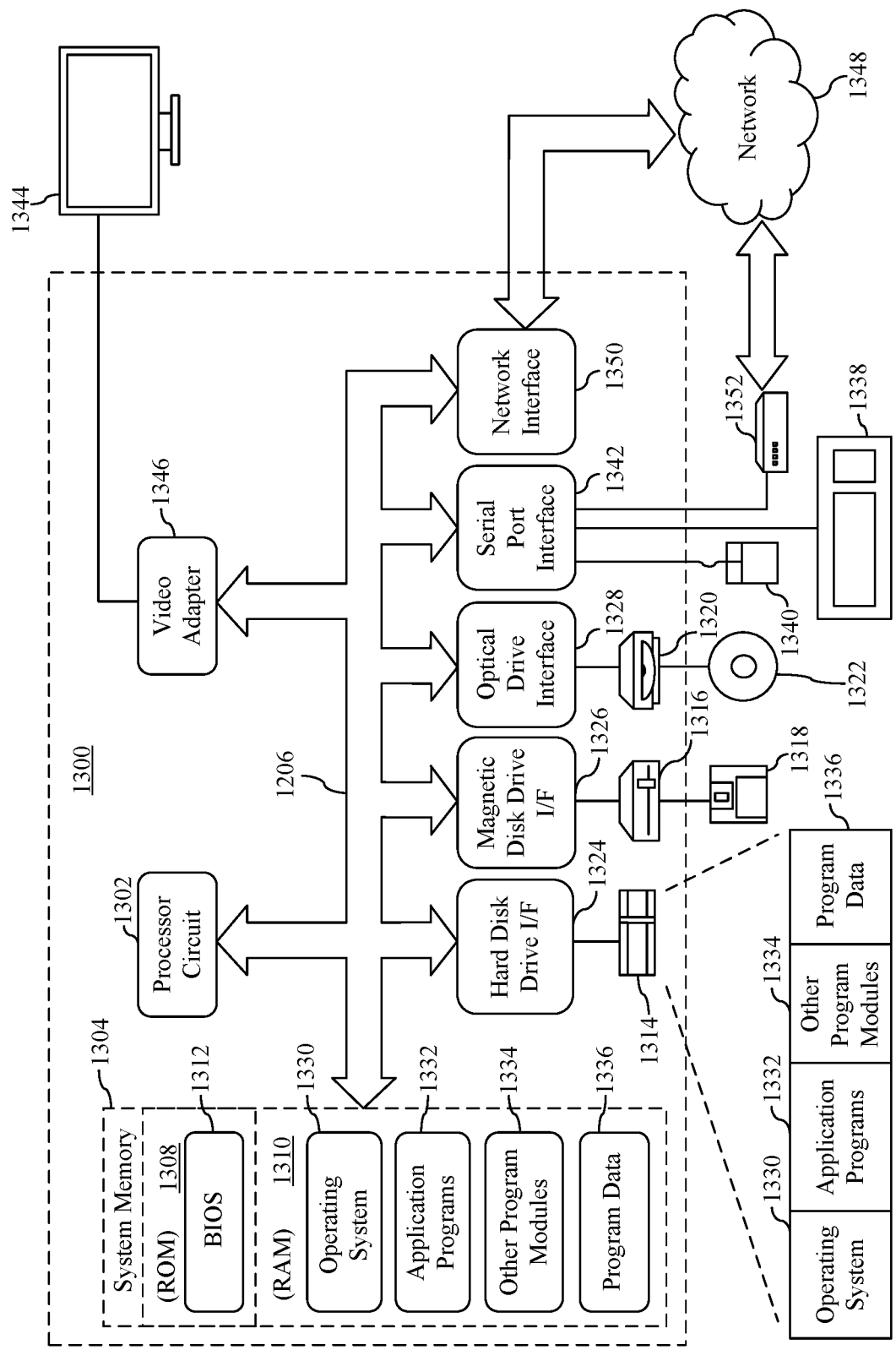
FIG. 13 is a block diagram of an example processor-based computer system that may be used to implement various embodiments.

FIG. 13 is a block diagram of an example processor-based computer system 1300 that may be used to implement various embodiments. Computing device 102, cloud services 304, support center 306, and resources 308 (depending on whether resources 308 comprise hardware and/or software resources) may each include any type of computing device, mobile or stationary, such as a desktop computer, a server, a video game console, etc. For example, computing device 102, cloud services 304, support center 306, and resources 308 (depending on whether resources 308 include hardware or software resources) may each be any type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™, Oculus Rift® by Oculus VR, LLC, etc.), a stationary computing device such as a desktop computer or PC (personal computer), a gaming console/ system (e.g., Microsoft Xbox®, Sony PlayStation®, Nintendo Wii® or Switch®, etc.), etc.

Computing device 102, cloud services 304, support center 306, and resources 308, may each be implemented in one or more computing devices containing features similar to those of computing device 1300 in stationary or mobile computer embodiments and/or alternative features. The description of computing device 1300 provided herein is provided for purposes of illustration, and is not intended to be limiting. Embodiments may be implemented in further types of computer systems, as would be known to persons skilled in the relevant art(s).

As shown in FIG. 13, computing device 1300 includes one or more processors, referred to as processor circuit 1302, a system memory 1304, and a bus 1306 that couples various system components including system memory 1304 to processor circuit 1302. Processor circuit 1302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1302 may execute program code stored in a computer readable medium, such as program code of operating system 1330, application programs 1332, other programs 1334, etc. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random-access memory (RAM) 1310. A basic input/output system 1312 (BIOS) is stored in ROM 1308.

Computing device 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1330, one or more application programs 1332, other programs 1334, and program data 1336. Application programs 1332 or other programs 1334 may include, for example, computer program logic (e.g., computer program code or instructions) for implementing selection manager 104, software deployment manager 106, resources 308, monitoring agents 310, incident manager 314, A/B automated issue detector 320, A/B monitoring reports, and any one or more of flowcharts 200, 400, 500, 600, 700, 800, 900, 1000, 1100, 1200 (including any step thereof), and/or further embodiments described herein. Program data 1336 may include, telemetry dataset 112, customer support dataset 114, customer exclusion list 116, selection history dataset 118, A/B resource groups dataset 120, telemetry database 312 data, support center database 316 data, and/or further embodiments described herein.

A user may enter commands and information into computing device 1300 through input devices such as keyboard 1338 and pointing device 1340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1302 through a serial port interface 1342 that is coupled to bus 1306, but may be connected by other interfaces, such as a parallel port, game port, or a universal serial bus (USB).

A display screen 1344 is also connected to bus 1306 via an interface, such as a video adapter 1346. Display screen 1344 may be external to, or incorporated in computing device 1300. Display screen 1344 may display information, as well as being a user interface for receiving user commands and/or other information (e.g., by touch, finger gestures, virtual keyboard, etc.). In addition to display screen 1344, computing device 1300 may include other peripheral output devices (not shown) such as speakers and printers.

Computing device 1300 is connected to a network 1348 (e.g., the Internet) through an adaptor or network interface 1350, a modem 1352, or other means for establishing communications over the network. Modem 1352, which may be internal or external, may be connected to bus 1306 via serial port interface 1342, as shown in FIG. 13, or may be connected to bus 1306 using another interface type, including a parallel interface.

As used herein, the terms "computer program medium," "computer-readable medium," and "computer-readable storage medium" are used to refer to physical hardware media such as the hard disk associated with hard disk drive 1314, removable magnetic disk 1318, removable optical disk 1322, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1332 and other programs 1334) may be stored on the hard disk, magnetic disk, optical disk, ROM, RAM, or other hardware storage medium. Such computer programs may also be received via network interface 1350, serial port interface 1342, or any other interface type. Such computer programs, when executed or loaded by an application, enable computing device 1300 to implement features of embodiments discussed herein. Accordingly, such computer programs represent controllers of computing device 1300.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Examples and Advantages

In an embodiment, a system is provided for dynamically selecting from among a plurality of cloud computing resources, a sample set of cloud computing resources for testing a software deployment, where the plurality of cloud computing resources is being deployed on behalf of a plurality of customers of a cloud computing provider to support a corresponding plurality of cloud computing services. The system comprises: one or more processors and one or more memory devices that store program code to be executed by the one or more processors. The program code comprises a selection manager configured to obtain telemetry data associated with the plurality of cloud computing resources and obtain customer support data associated with each of the plurality of customers. The selection manager is configured to select a subset of the plurality of customers of the cloud computing provider based at least on the customer support data and select a candidate subset of the plurality of cloud computing resources based at least on the selected subset of the plurality of customers and the telemetry data. The selection manager is configured to randomly select the sample set of cloud computing resources for testing the software deployment from among the candidate subset.

In an embodiment of the foregoing system, the selection manager is configured to select the subset of the plurality of customers of the cloud computing provider by selecting the subset of the plurality of customers of the cloud computing provider based at least on the customer support data and a customer exclusion list.

In an embodiment of the foregoing system, the selection manager is configured to select the candidate subset of the plurality of cloud computing resources by selecting the candidate subset of the plurality of cloud computing resources based at least on the selected subset of the plurality of customers, the telemetry data, and usage pattern data associated with the plurality of cloud computing resources.

In an embodiment of the foregoing system, the selection manager being configured to select the candidate subset of the plurality of cloud computing resources based on the usage pattern data associated with the plurality of cloud computing resources comprises comparing the usage pattern data associated with at least one of the plurality of cloud computing resources to a configurable usage pattern criterion.

In an embodiment of the foregoing system, the selection manager is configured to select the candidate subset of the plurality of cloud computing resources by selecting the candidate subset of the plurality of cloud computing resources based at least on the selected subset of the plurality of customers, the telemetry data, and data indicating whether each cloud computing resource in the plurality of cloud computing resources has previously been selected for a different sample set.

In an embodiment of the foregoing system, the program code further comprises a software deployment manager configured to deploy software to the sample set, designate the sample set as a B resource group, designate a set of the plurality of cloud computing resources to which the software has not been deployed as an A resource group, and auto-detect issues in the B resource group based on telemetry data and customer support data associated with the A resource group and the B resource group.

In an embodiment of the foregoing system, the software deployment manager is configured to identify at least one of the following based on the telemetry data and the customer support data associated with the A resource group and the B resource group: resource process crash signatures of the B resource group, an increase in system error codes returned to one or more customers associated with the B resource group, new system error codes returned to one or more customers associated with the B resource group, a negative change in resource usage in the B resource group, performance-related issues in the B resource group, systematic feature failures in the B resource group, or customer-reported problems associated with the B resource group.

In an embodiment of the foregoing system, the software deployment manager is configured to perform at least one of the following based on the telemetry data and the customer support data associated with the A resource group and the B resource group: cause another sample set of cloud computing resources to be selected for retesting the software deployment, deploy the software to additional resources of the plurality of cloud computing resources, or roll back the deployment of the software from the sample set.

In an embodiment, a method is provided for dynamically selecting from among a plurality of cloud computing resources, a sample set of cloud computing resources for testing a software deployment, the plurality of cloud computing resources is deployed on behalf of a plurality of customers of a cloud computing provider to support a corresponding plurality of cloud computing services. The method comprises obtaining telemetry data associated with the plurality of cloud computing resources and obtaining customer support data associated with each of the plurality of customers. The method comprises selecting a subset of the plurality of customers of the cloud computing provider based at least on the customer support data and selecting a candidate subset of the plurality of cloud computing resources based at least on the selected subset of the plurality of customers and the telemetry data. The method comprises selecting the sample set of cloud computing resources for testing the software deployment from among the candidate subset.

In an embodiment of the foregoing method, the selecting the subset of the plurality of customers of the cloud computing provider comprises selecting the subset of the plurality of customers of the cloud computing provider based at least on the customer support data and a customer exclusion list.

In an embodiment of the foregoing method, selecting the candidate subset of the plurality of cloud computing resources comprises selecting the candidate subset of the plurality of cloud computing resources based at least on the selected subset of the plurality of customers, the telemetry data, and usage pattern data associated with the plurality of cloud computing resources.

In an embodiment of the foregoing method, selecting the candidate subset of the plurality of cloud computing resources based on the usage pattern data associated with the plurality of cloud computing resources comprises comparing the usage pattern data associated with at least one of the plurality of cloud computing resources to a configurable usage pattern criterion.

In an embodiment of the foregoing method, selecting the candidate subset of the plurality of cloud computing resources comprises selecting the candidate subset of the plurality of cloud computing resources based at least on the selected subset of the plurality of customers, the telemetry data, and data indicating whether each cloud computing resource in the plurality of cloud computing resources has previously been selected for a different sample set.

In an embodiment of the foregoing method, the method further comprises deploying software to the sample set, designating the sample set as a B resource group, designating a set of the plurality of cloud computing resources to which the software has not been deployed as an A resource group, and auto-detecting issues in the B resource group based on telemetry data and customer support data associated with the A resource group and the B resource group.

In an embodiment of the foregoing method, the method further comprises identifying one or more of the following based on the telemetry data and the customer support data associated with the A resource group and the B resource group: resource process crash signatures of the B resource group, an increase in system error codes returned to one or more customers associated with the B resource group, new system error codes returned to one or more customers associated with the B resource group, a negative change in resource usage in the B resource group, performance-related issues in the B resource group, systematic feature failures in the B resource group, or customer-reported problems associated with the B resource group.

In an embodiment of the foregoing method, the method further comprises performing at least one of the following based on the telemetry data and the customer support data associated with the A resource group and the B resource group: selecting another sample set of cloud computing resources for retesting the software deployment, deploying the software to additional resources of the plurality of cloud computing resources, or rolling back the deployment of the software from the sample set.

In an embodiment, a computer-readable medium having program code recorded thereon that when executed by at least one processor causes the at least one processor to perform a method for dynamically selecting from among a plurality of cloud computing resources a sample set of cloud computing resources for testing a software deployment. The plurality of cloud computing resources is deployed on behalf of a plurality of customers of a cloud computing provider to support a corresponding plurality of cloud computing services. The method comprises obtaining telemetry data associated with the plurality of cloud computing resources and obtaining customer support data associated with each of the plurality of customers. The method comprises selecting a subset of the plurality of customers of the cloud computing provider based at least on the customer support data and selecting a candidate subset of the plurality of cloud computing resources based at least on the selected subset of the plurality of customers and the telemetry data. The method comprises randomly selecting the sample set of cloud computing resources for testing the software deployment from among the candidate subset.

In an embodiment of the foregoing computer-readable medium, the selecting the subset of the plurality of customers of the cloud computing provider comprises selecting the subset of the plurality of customers of the cloud computing provider based at least on the customer support data and whether a customer identifier associated with each customer is included in a customer exclusion list.

In an embodiment of the foregoing computer-readable medium, selecting the candidate subset of the plurality of cloud computing resources comprises selecting the candidate subset of the plurality of cloud computing resources based at least on the selected subset of the plurality of customers, the telemetry data, and usage pattern data associated with the plurality of cloud computing resources.

In an embodiment of the foregoing computer-readable medium, selecting the candidate subset of the plurality of cloud computing resources based on the usage pattern data associated with the plurality of cloud computing resources comprises comparing the usage pattern data associated with at least one of the plurality of cloud computing resources to a configurable usage pattern criterion.

V Conclusion

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:

1. A system implemented in a computer for dynamically selecting from among a plurality of cloud computing resources of a cloud computing provider a sample set of cloud computing resources for testing a software deployment, the plurality of cloud computing resources being deployed on behalf of a plurality of customers of the cloud computing provider to support a corresponding plurality of cloud computing services, the system comprising:
  one or more processors; and
  one or more memory devices that store program code to be executed by the one or more processors, the program code comprising:
  a selection manager configured to:
    retrieve stored telemetry data comprising measurements collected from the plurality of cloud computing resources of the cloud computing provider for use in selecting cloud computing resources for participating in a software deployment test of particular software executing on the sample set of cloud computing resources:
    retrieve stored customer support data comprising user input cloud resource issues associated with each of the plurality of customers, wherein each of the plurality of customers is associated with one or more of the plurality of cloud computing resources;
    select a subset of the plurality of customers of the cloud computing provider for inclusion in the software deployment test based at least on the customer support data;
    select a candidate subset of the plurality of cloud computing resources for participating in the software deployment test based at least on the selected subset of the plurality of customers, aspects of the particular software, and the telemetry data, wherein the telemetry data of each resource of the candidate subset indicates workload activity sufficient for testing the aspects of the particular software; and
    randomly select the sample set of cloud computing resources for participating in the software deployment test from among the candidate subset; and
  a software deployment manager configured to:
    deploy the particular software in the sample set of cloud computing resources; and
    execute the deployment software test in the sample set of cloud computing resources.

2. The system of claim 1, wherein the selection manager is configured to select the subset of the plurality of customers of the cloud computing provider for inclusion in the software deployment test by:
  selecting the subset of the plurality of customers of the cloud computing provider based at least on the customer support data and a customer exclusion list.

3. The system of claim 1, wherein the selection manager is configured to select the candidate subset of the plurality of cloud computing resources for participating in the software deployment test by:
  selecting the candidate subset of the plurality of cloud computing resources based at least on the selected subset of the plurality of customers, the aspects of the particular software, the telemetry data, and usage pattern data associated with the plurality of cloud computing resources.

4. The system of claim 3, wherein the selection manager is configured to select the candidate subset of the plurality of cloud computing resources for participating in the software deployment test based on the usage pattern data associated with the plurality of cloud computing resources comprises:

comparing the usage pattern data associated with at least one of the plurality of cloud computing resources to a configurable usage pattern criterion.

5. The system of claim 1, wherein the selection manager is configured to select the candidate subset of the plurality of cloud computing for participating in the software deployment test resources by:

selecting the candidate subset of the plurality of cloud computing resources based at least on the selected subset of the plurality of customers, aspects of the particular software, the telemetry data, and data indicating whether each cloud computing resource in the plurality of cloud computing resources has previously been selected for a different sample set.

6. The system of claim 1, wherein the software deployment manager is further configured to:

designate the sample set as a B resource group;

designate a set of the plurality of cloud computing resources to which the software has not been deployed as an A resource group; and auto-detect issues in the B resource group based on telemetry data and customer support data associated with the A resource group and the B resource group.

7. The system of claim 6, wherein the software deployment manager is configured to identify at least one of the following based on the telemetry data and the customer support data associated with the A resource group and the B resource group:

resource process crash signatures of the B resource group;

an increase in system error codes returned to one or more customers associated with the B resource group;

new system error codes returned to one or more customers associated with the B resource group;

a negative change in resource usage in the B resource group;

performance-related issues in the B resource group;

systematic feature failures in the B resource group; or customer-reported problems associated with the B resource group.

8. The system of claim 6, wherein the software deployment manager is configured to perform at least one of the following based on the telemetry data and the customer support data associated with the A resource group and the B resource group:

cause another sample set of cloud computing resources to be selected for retesting the software deployment;

deploy the software to additional resources of the plurality of cloud computing resources;

or roll back the deployment of the software from the sample set.

9. A computer implemented method for dynamically selecting from among a plurality of cloud computing resources of a cloud computing provider a sample set of cloud computing resources for testing a software deployment, the plurality of cloud computing resources being deployed on behalf of a plurality of customers of the cloud computing provider to support a corresponding plurality of cloud computing services, the method comprising:

retrieving stored telemetry data comprising measurements collected from the plurality of cloud computing resources of the cloud computing provider for use in selecting cloud computing resources for participating in a software deployment test of particular software executing on the sample set of cloud computing resources;

retrieving stored customer support data comprising user input cloud resource issues associated with each of the plurality of customers, wherein each of the plurality of customers is associated with one or more of the plurality of cloud computing resources;

selecting a subset of the plurality of customers of the cloud computing provider for inclusion in the software deployment test based at least on the customer support data;

selecting a candidate subset of the plurality of cloud computing resources for participating in the software deployment test based at least on the selected subset of the plurality of customers, aspects of the particular software, and the telemetry data, wherein the telemetry data of each resource of the candidate subset indicates workload activity sufficient for testing the aspects of the particular software; and selecting the sample set of cloud computing resources for participating in the software deployment test from among the candidate subset;

deploying the particular software in the sample set of cloud computing resources; and executing the deployment software test in the sample set of cloud computing resources.

10. The method of claim 9, wherein the selecting the subset of the plurality of customers of the cloud computing provider for inclusion in the software deployment test comprises:

selecting the subset of the plurality of customers of the cloud computing provider based at least on the customer support data and a customer exclusion list.

11. The method of claim 9, wherein selecting the candidate subset of the plurality of cloud computing resources for participating in the software deployment test comprises:

selecting the candidate subset of the plurality of cloud computing resources based at least on the selected subset of the plurality of customers, the aspects of the particular software, the telemetry data, and usage pattern data associated with the plurality of cloud computing resources.

12. The method of claim 11, wherein selecting the candidate subset of the plurality of cloud computing resources for participating in the software deployment test based on the usage pattern data associated with the plurality of cloud computing resources comprises:

comparing the usage pattern data associated with at least one of the plurality of cloud computing resources to a configurable usage pattern criterion.

13. The method of claim 9, wherein selecting the candidate subset of the plurality of cloud computing resources for participating in the software deployment test comprises:

selecting the candidate subset of the plurality of cloud computing resources based at least on the selected subset of the plurality of customers, the aspects of the particular software, the telemetry data, and data indicating whether each cloud computing resource in the plurality of cloud computing resources has previously been selected for a different sample set.

14. The method of claim 9, further comprising:

designating the sample set as a B resource group;

designating a set of the plurality of cloud computing resources to which the software has not been deployed as an A resource group; and auto-detecting issues in the B resource group based on telemetry data and customer support data associated with the A resource group and the B resource group.

15. The method of claim 14, further comprising identifying one or more of the following based on the telemetry data and the customer support data associated with the A resource group and the B resource group:
resource process crash signatures of the B resource group;
an increase in system error codes returned to one or more customers associated with the B resource group;
new system error codes returned to one or more customers associated with the B resource group;
a negative change in resource usage in the B resource group;
performance-related issues in the B resource group;
systematic feature failures in the B resource group; or
customer-reported problems associated with the B resource group.

16. The method of claim 14, further comprising performing at least one of the following based on the telemetry data and the customer support data associated with the A resource group and the B resource group:
selecting another sample set of cloud computing resources for retesting the software deployment:
deploying the software to additional resources of the plurality of cloud computing resources; Of rolling back the deployment of the software from the sample set.

17. A computer-readable storage medium having program code recorded thereon that when executed by at least one processor causes the at least one processor to perform a method for dynamically selecting from among a plurality of cloud computing resources of a cloud computing provider a sample set of cloud computing resources for testing a software deployment, the plurality of cloud computing resources being deployed on behalf of a plurality of customers of the cloud computing provider to support a corresponding plurality of cloud computing services, the method comprising:
retrieving stored telemetry data comprising measurements collected from the plurality of cloud computing resources of the cloud computing provider for use in selecting cloud computing resources for participating in a software deployment test of particular software executing on the sample set of cloud computing resources;
retrieving stored customer support data comprising user input cloud resource issues associated with each of the plurality of customers, wherein each of the plurality of customers is associated with one or more of the plurality of cloud computing resources;
selecting a subset of the plurality of customers of the cloud computing provider for inclusion in the software deployment test based at least on the customer support data;
selecting a candidate subset of the plurality of cloud computing resources for participating in the software deployment test based at least on the selected subset of the plurality of customers, aspects of the particular software, and the telemetry data, wherein the telemetry data of each resource of the candidate subset indicates workload activity sufficient for testing the aspects of the particular software; and
randomly selecting the sample set of cloud computing resources for participating in the software deployment test from among the candidate subset;
deploying the particular software in the sample set of cloud computing resources: and
executing the deployment software test in the sample set of cloud computing resources.

18. The computer-readable storage medium of claim 17, wherein the selecting the subset of the plurality of customers of the cloud computing provider for inclusion in the software deployment test comprises:
selecting the subset of the plurality of customers of the cloud computing provider based at least on the customer support data and whether a customer identifier associated with each customer is included in a customer exclusion list.

19. The computer-readable storage medium of claim 17, wherein selecting the candidate subset of the plurality of cloud computing resources for participating in the software deployment test comprises:
selecting the candidate subset of the plurality of cloud computing resources based at least on the selected subset of the plurality of customers, the aspects of the particular software, the telemetry data, and usage pattern data associated with the plurality of cloud computing resources.

20. The computer-readable storage medium of claim 19, wherein selecting the candidate subset of the plurality of cloud computing resources for participating in the software deployment test based on the usage pattern data associated with the plurality of cloud computing resources comprises:
comparing the usage pattern data associated with at least one of the plurality of cloud computing resources to a configurable usage pattern criterion.

* * * * *